United States Patent
Laupheimer

(10) Patent No.: US 7,331,281 B2
(45) Date of Patent: Feb. 19, 2008

(54) PRESS WITH VERTICALLY RECIPROCATED FRAME

(75) Inventor: Ulrich Laupheimer, Laupheim (DE)

(73) Assignee: Uhlmann Pac-Systeme GmbH & Co. KG, Laupheim (DE)

( * ) Notice: Subject to any disclaimer, the term of this patent is extended or adjusted under 35 U.S.C. 154(b) by 0 days.

(21) Appl. No.: 11/352,450

(22) Filed: Feb. 10, 2006

(65) Prior Publication Data

US 2006/0180035 A1    Aug. 17, 2006

(30) Foreign Application Priority Data

Feb. 14, 2005   (DE)   ............... 10 2005 006 782

(51) Int. Cl.
*B30B 1/06*      (2006.01)
*B30B 15/06*     (2006.01)

(52) U.S. Cl. ............ 100/209; 100/264; 100/282; 72/408; 72/453.12; 156/580

(58) Field of Classification Search ........... 100/209, 100/214, 219, 264, 265, 269.11, 269.13, 269.17, 100/280, 282; 72/407, 408, 453.09, 453.12; 425/394, 406, 450.1, 451; 156/580, 581, 156/583.1

See application file for complete search history.

(56) References Cited

U.S. PATENT DOCUMENTS

| 3,777,543 | A | * | 12/1973 | Kokkola et al. | ........... 72/466.9 |
| 3,818,825 | A | * | 6/1974 | Nowak | ........................ 100/209 |
| 4,026,226 | A | * | 5/1977 | Hahn et al. | .................... 413/8 |
| 5,031,495 | A | | 7/1991 | Kogane | |
| 5,819,510 | A | | 10/1998 | Bochtler | |
| 6,834,476 | B2 | | 12/2004 | Konishi | |
| 2005/0000265 | A1 | * | 1/2005 | Collinson | .................... 72/407 |

FOREIGN PATENT DOCUMENTS

DE   199 60 084   6/2001

* cited by examiner

*Primary Examiner*—Jimmy Nguyen
(74) *Attorney, Agent, or Firm*—Andrew Wilford

(57) ABSTRACT

A press has an upper traverse, a lower traverse below the upper traverse, and vertical frame elements extending between the traverse, fixing same together against relative movement, and forming a rigid frame with the upper traverse and lower traverse. A central traverse is vertically reciprocal on the elements between the upper and lower traverses. A workpiece is fed horizontally through the press between the upper traverse and the central traverse. A stationary support is provided adjacent the frame, and the frame is supported for at least limited vertical movement relative to the support. A drive connected between the support, the frame, and the central traverse vertically reciprocates the frame and the central traverse relative to the support.

14 Claims, 5 Drawing Sheets

PRESS WITH VERTICALLY RECIPROCATED FRAME

FIELD OF THE INVENTION

The present invention relates to a press. More particularly this invention concerns used to laminate together a pair of horizontally traveling workpieces.

BACKGROUND OF THE INVENTION

U.S. Pat. Nos. 5,031,495, 5,819,510, and 6,834,476 and U.S. published application 2002-23417 describe presses used to laminate together two foils that are either thermoplastic or that have confronting faces coated with thermally activatable adhesive. To this end there is typically a massive press frame having an upper traverse, a lower traverse, and several vertical tie rods fixing the two traverses together so that they cannot move relatively to each other. A central table or traverse can be reciprocated vertically on the tie rods between the upper and lower traversed.

The workpiece typically comprises an essentially flat and planar upper foil or sheet and a lower foil or sheet formed with an array of pockets or blisters that project downward and that are filled with some product. e.g. a foodstuff or medicament, to be encapsulated in the pocket by sealing the upper foil down against the lower foil around each pocket. Thus in the simplest system the upper traverse carries a heated upper die that has a planar lower face stationarily positioned immediately above the upper foil and the reciprocal table carries a lower die having a plurality of upwardly open recesses arrayed to fit around the pockets of the lower foil. When the lower die is pushed upward against the workpiece, it presses the two foils against the lower face of the upper die and seals them together.

With such an arrangement it is necessary to accurately feed the workpiece to the press, so that it is as close as is possible without overheating it to the upper die, but still out of contact therewith. Thus it the workpiece thickness changes or some other parameter is varied, it is necessary to meticulously readjust the equipment.

OBJECT OF THE INVENTION

It is therefore an object of the present invention to provide an improved press.

Another abject in the provision of such an improved press that overcomes the above-given disadvantages, in particular that can be used to laminate a pocketed sheet with a flat sheet, or even two pocketed sheets together.

A further object is the provision of such a press that can readily accommodate workpieces fed in at different levels.

SUMMARY OF THE INVENTION

A press has according to the invention an upper traverse, a lower traverse below the upper traverse, and vertical frame elements extending between the traverses, fixing same together against relative movement, and forming a rigid frame with the upper traverse and lower traverse. A central traverse is vertically reciprocal on the elements between the upper and lower traverses. A workpiece is fed horizontally through the press between the upper traverse and the central traverse. A stationary support is provided adjacent the frame, and the frame is supported for at least limited vertical movement relative to the support. A drive connected between the support, the frame, and the central traverse vertically reciprocates the frame and the central traverse relative to the support.

Such a work station has the advantage that a single drive serves both for positioning the frame carrying the upper traverse and the central traverse. The upper traverse moves down and the central traverse moves up with each cycle, making it fairly easy to accommodate any workpiece.

According to the invention an upper die having a generally flat, horizontal, and downwardly directed lower face is fixed to the upper traverse, and a lower die fixed to the central traverse has a horizontal and upwardly directed lower face formed with an array of upwardly open recesses. The workpiece has downwardly projecting pockets fittable in the recesses. The workpiece is stepped in a horizontal transport direction through the press synchronously as the press is opened and closed.

In accordance with the invention the drive includes a shaft journaled in one of the traverses, an eccentric carried on the shaft, a link connecting the eccentric to another of the traverses, and a motor connected to the shaft for rotating same. The link is typically an arm having one end carried on the eccentric and an opposite end journaled on the other traverse. The other traverse is the central traverse. Furthermore according to the invention another eccentric on the shaft bears on the support and is set such that the central traverse and the frame are reciprocated synchronously oppositely.

Thus a single shaft is rotated to synchronously and oppositely move the frame carrying the upper traverse and the central traverse. Obviously the stroke of the central traverse is greater than that of the frame, since it is moving upward on the frame while the frame is moving downward, and vice versa. The drive further includes a roller on the support bearing on the other eccentric.

The frame according to the invention is supported on at least one spring braced vertically between the frame and the support. A counterweight could also be used. Either way, this makes it possible for a relatively light-duty drive to vertically reciprocate the massive frame.

According to a further feature of the invention a cam arrangement is operatively upwardly engageable with the frame and downwardly with the support for establishing a lowermost position for the frame. Thus this cam system simply limits the vertical reciprocation of the frame, the vertical reciprocation of the central traverse relative to the frame remains unchanged. This provides a very simple system for adjusting the press for differently dimensioned and/or oriented workpieces. The cam itself in shifted by a pneumatic or hydraulic actuator or a linear motor.

The support carries a roller and the cam has an angled cam surface bearing downward on the roller. Furthermore the cam is a bar linearly shiftable in one of the upper and lower traverse and formed with the cam surface. A latch is provided for securing the cam bar in at least one position with the cam surface bearing downward on the roller.

BRIEF DESCRIPTION OF THE DRAWING

The and other objects, features, and advantages will become more readily apparent from the following description, reference being made to the accompanying drawing in which.

SPECIFIC DESCRIPTION

Figure 1:
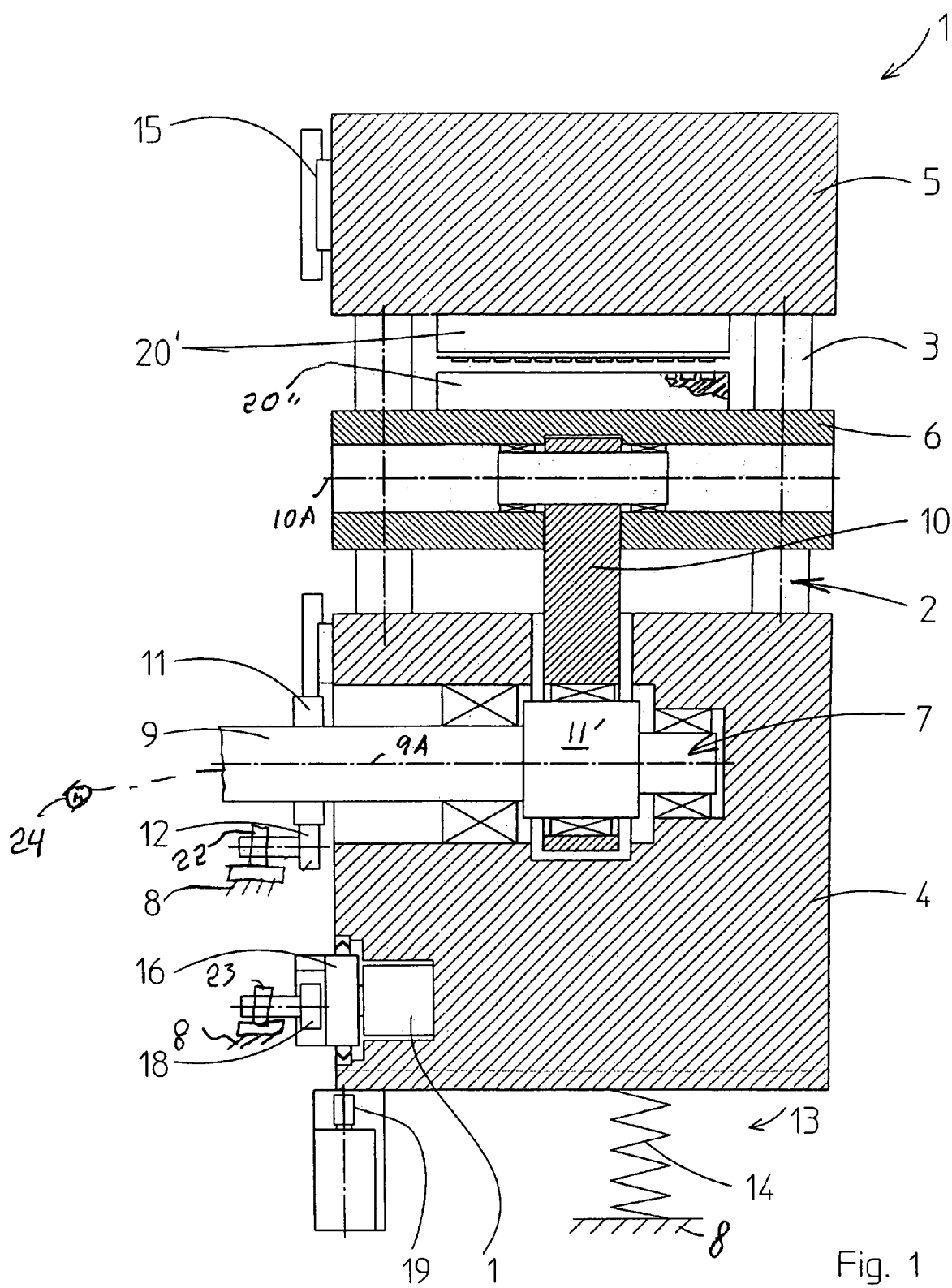
FIG. 1 is a cross section through a press according to the invention.
Figure 2:
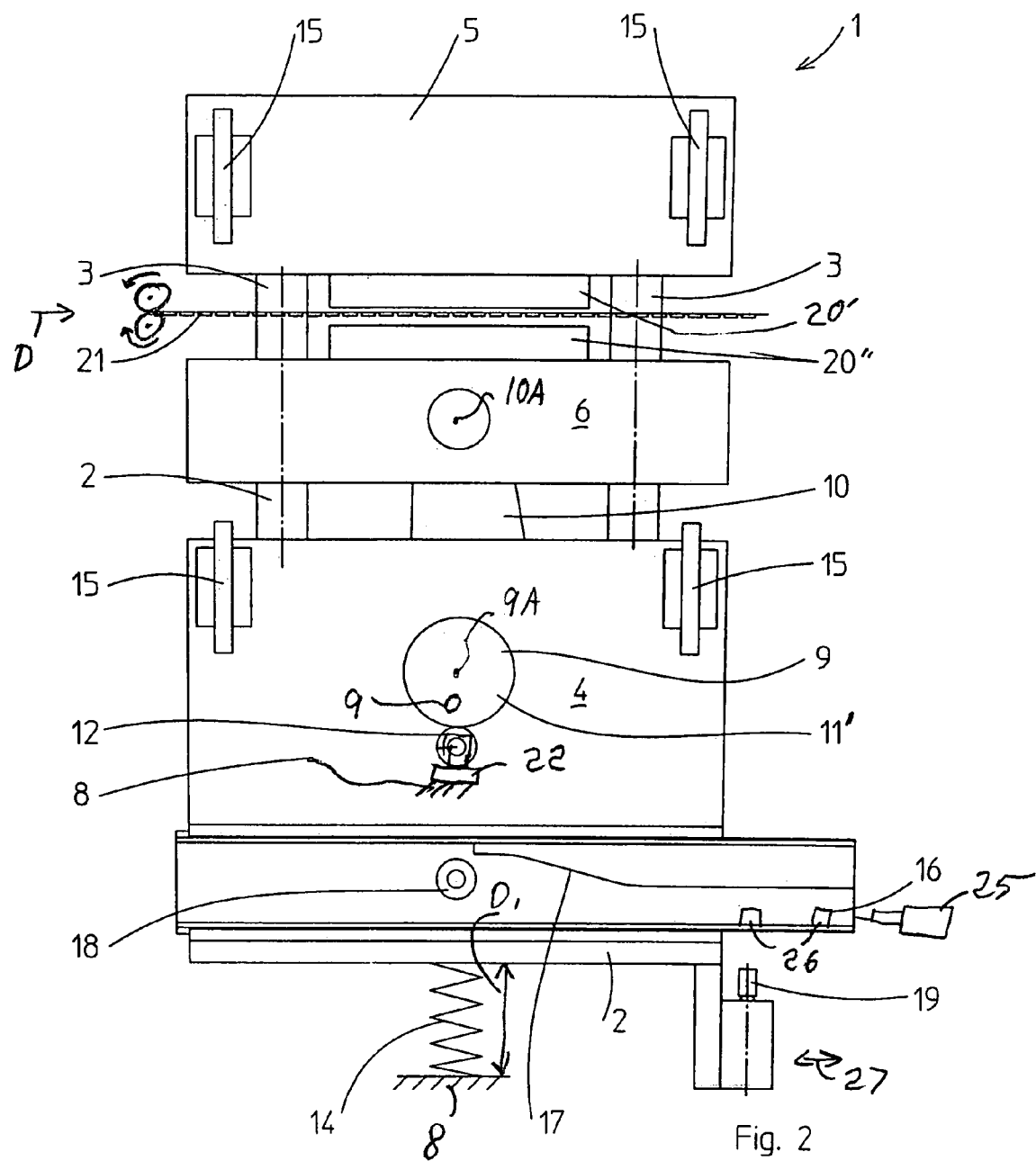
FIG. 2 is a partly diagrammatic side view of the press in the open position.
Figure 3:
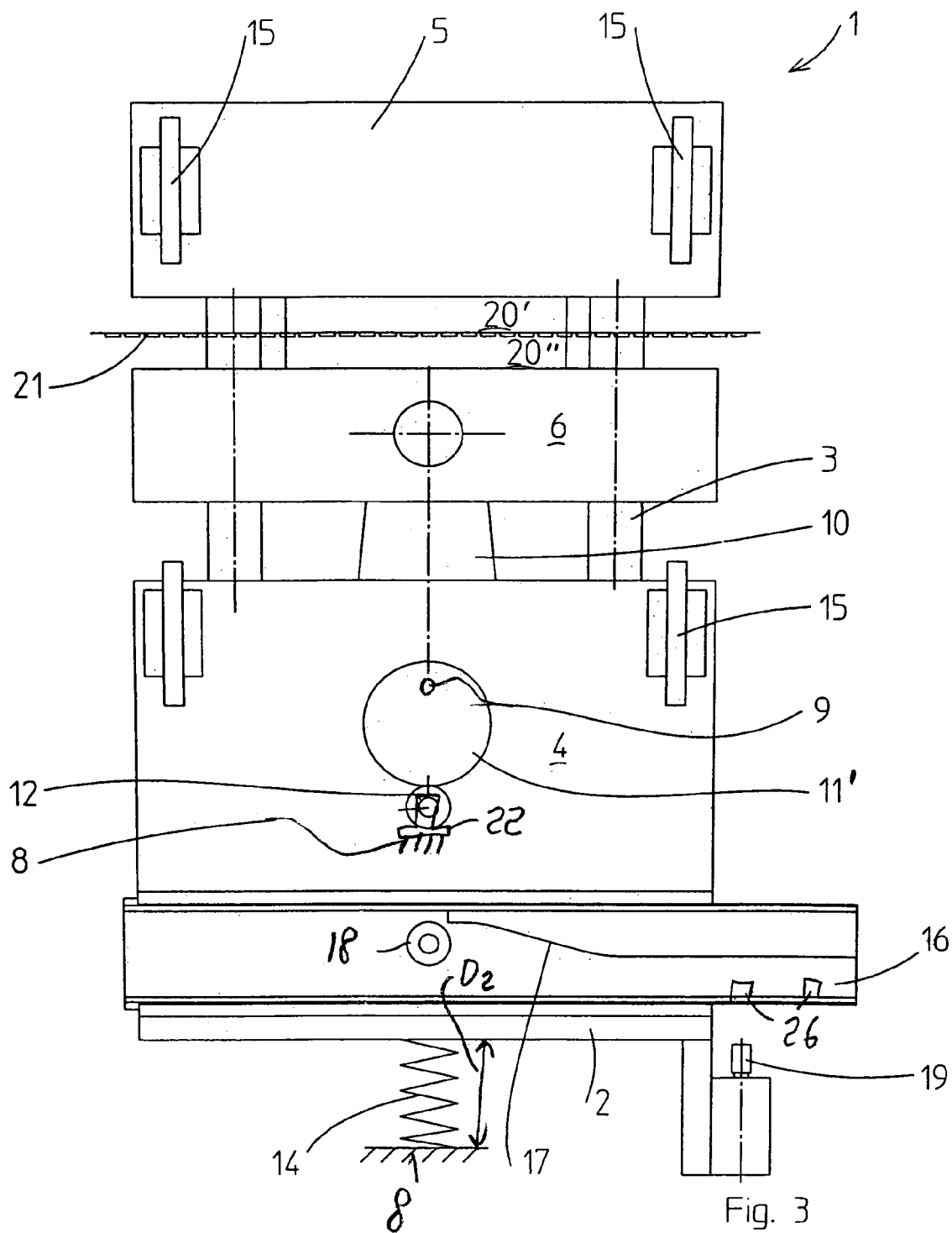
FIG. 3 in a side view of the press in the closed positions.

As seen in FIGS. 1 through 5 a press 1 according to the invention basically comprises a frame 2 formed by a plurality of vertical elements or tie rods 3 with lower ends fixed on a massive base or lower traverse 4 and upper ends fixed in a massive upper traverse 5. A central traverse 6 is vertically shiftable by a drive 7 on the tie rods 3 between the traverses 4 and 5. An upper die 20' with a planar lower face is carried an a lower surface of the upper traverse 5 and a lower die 20" with a flat upper face formed with am array of recesses is carried on an upper surface of the central traverse 6. A workpiece 21 (FIGS. 2-5) comprised of a flat upper foil and a lower foil formed with an array of upwardly open pockets is passed in a horizontal plane in a travel direction D through the press 1 between the upper die 20' and the lower die 20". The unillustrated recesses in the lower die 20" fit with the pockets in the workpiece 21 so that its two foils can be sealed together between these pockets, which are filed with some product.

The entire frame 2 is supported on a biasing device 13 comprised of one or more springs 14 braced between the bottom of the lower traverse 4 and a fixed support shown schematically at 8. The stiffness of the spring 14 is such that it generally can support the frame 2, traverse 6, drive 7, and dies 20' and 20" such that they can be moved vertically limitedly with relative ease. Four linear guides 15 connected between the support 8 and the frame 2, two at the upper traverse 5 and two at the lower traverse 4, ensure that the frame 2 and its associated equipment can only move vertically relative to the support 8. Instead of the spring 14, a counterweight could be used.

According to the invention the drive 7 comprises a shaft 9 journaled in the lower traverse 4 for rotation therein about a horizontal axis 9A perpendicular to the direction D and carries a pair of eccentric disks 11' and 11". The inner eccentric 11" is journaled in a lower end of a link arm 10 whose upper end is journaled centrally of the traverse 6 at an axis 10A parallel to the axis 9A in the central traverse 6. Thus rotation of the shaft 9 about its axis 9A by, for example, a motor 24 will cause the central traverse 6 to reciprocate vertically relative to the frame 2.

The eccentric 11", which is mounted outside the lower traverse 4, bears downward on a roller 12 carried in a mount 22 fixed adjacent the frame 2 on the support 8. Thus as the shaft 9 rotates the lower traverse 4 and with it the entire frame 2 reciprocates vertically relative to the stationary support 8. The two eccentrics 11' and 11" are met angularly on the shaft 9 relative to each other such that, as the frame 2 carrying the upper die 20' moves downward, the central traverse 6 moves upward, shifting the equipment between the open position of FIG. 2 and the closed position of FIG. 3. In the open position, the frame 2 is spaced a distance $D_1$ from the support 8, and in the closed position it is spaced a somewhat larger distance $D_2$ from it.

Figure 4:
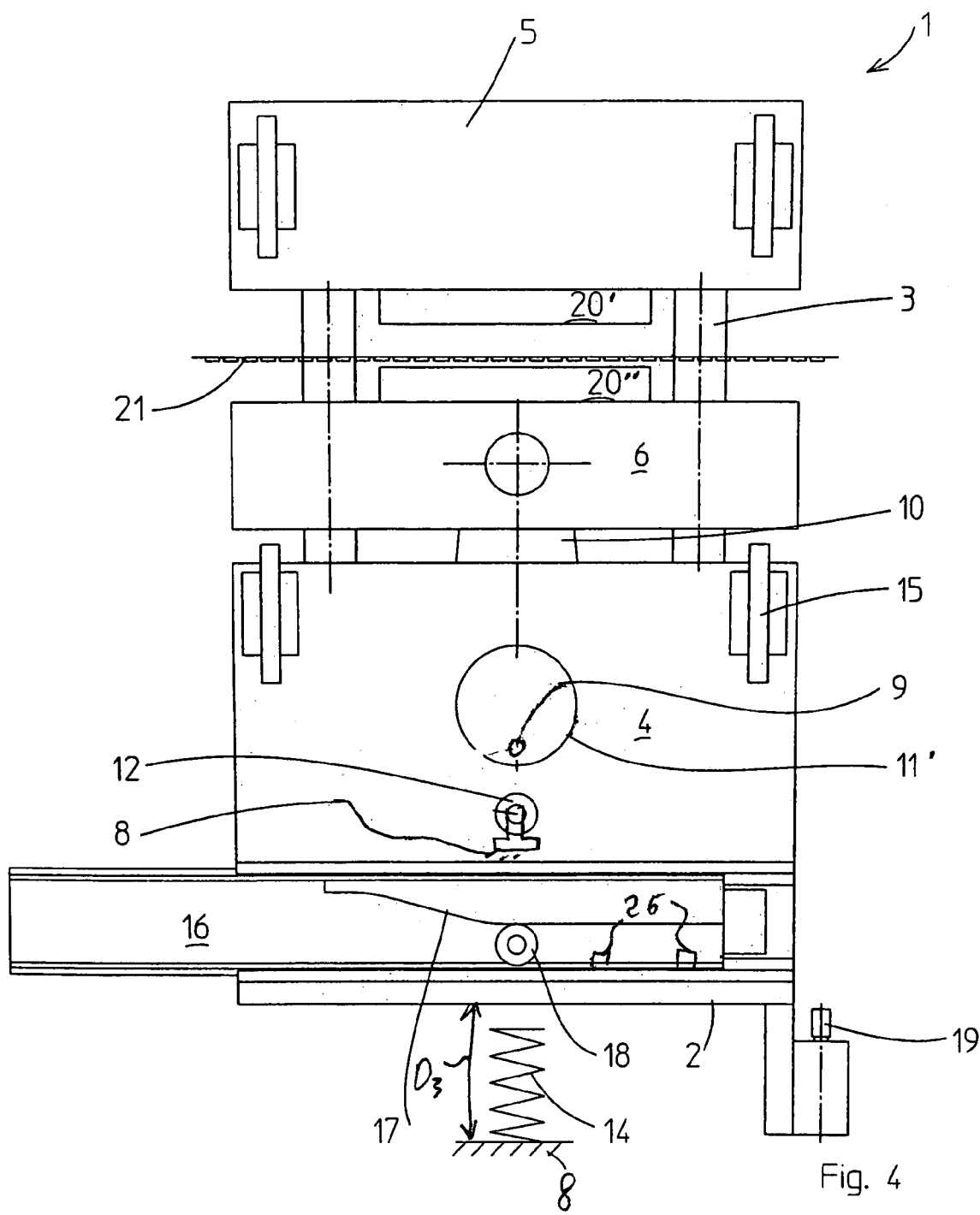
FIGS. 4 and 5 are side views of the press with the frame set in fully raised and partially raised positions.
Figure 5:
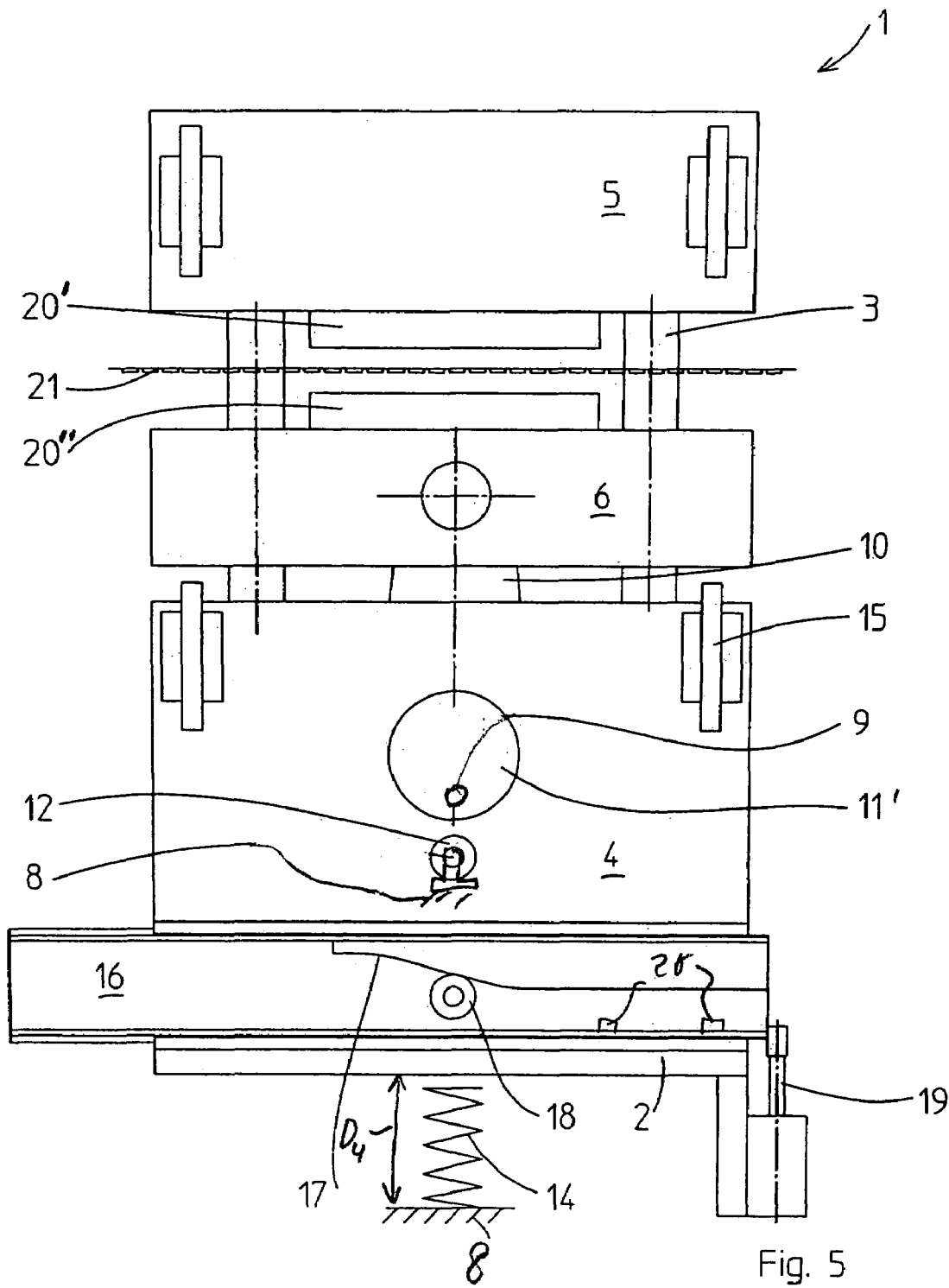

Furthermore according to the invention a bar 16 extending in the direction through the lower traverse 4 so that it is vertically coupled to the frame 2 is formed with an angled cam 17 that can engage another roller 18 carried on a mount 23 fixed on the stationary support 8. This cam bar 16 can be shifted horizontally, for example by a hydraulic linear actuator 25, between a position shown in FIGS. 2 and 3 where it never engages the roller 18 and, therefore, has no affect on vertical movement of the frame 2, and the positions of FIGS. 4 and 5 in which it inhibits downward displacement of the frame 2. In the FIG. 4 position the frame 2 is raised a maxium distance $D_3$ so that the outer eccentric 11' only lifts it a tiny bit once on each rotation. In FIG. 5 it is raised a distance $D_4$ smaller than $D_3$ but greater than $D_1$ so that the outer eccentric 11' is effective over somewhat more of each rotation, not an such as in the position of FIGS. 1 and 2 when it bears over its entire rotation on the roller 18, but less than in FIG. 4. In all positions, the stroke of the upper traverse 5 relative to the frame 2 is the same, so even when the frame 2 in lifted somewhat ad the length of its vertical travel is limited by the cam 17 the press 1 will close fully. In the positions of FIGS. 4 and 5 the frame 2 is lifted off the spring 14.

A latch 19 in provided that can engage past an end of the cam bar 16 or in notches 25 formed in it to hold it in intermediate positions. Several such latches 19 can be provide, or the latch 19 can be shiftable as shown by arrow 27 to define different positions for the cam bar 17.

I claim:
1. A press comprising:
   an upper traverse;
   a lower traverse below the upper traverse;
   vertical frame elements extending between the traverses, the vertical frame elements, the upper traverse and the lower traverse are joined together to form and define a rigid frame;
   a central traverse vertically reciprocal on the elements between the upper and lower traverses;
   means for feeding a workpiece horizontally through the press between the upper traverse and the central traverse;
   a stationary support adjacent the frame;
   a linear guide in which the frame is capable of at least limited vertical movement relative to the support, the linear guide is connected between the frame and the support; and
   drive means connected between the support, the frame, and the central traverse for vertically reciprocating the frame and the central traverse relative to the support, the drive means comprises a shaft journaled in one of the traverses, an eccentric carried on the shaft, a link connecting the eccentric to another of the traverses, and a motor connected to the shaft for rotating same.

2. The press defined in claim 1, further comprising:
   an upper die having a generally flat, horizontal, and downwardly directed lower face fixed to the upper traverse; and
   a lower die fixed to the central traverse and having a horizontal and upwardly directed lower face formed with an array of upwardly open recesses, the workpiece having downwardly projecting pockets fittable in the recesses.

3. The press defined in claim 1 further comprising at least one spring braced vertically between the frame and the support.

4. A press comprising:
   an upper traverse;
   a lower traverse below the upper traverse;
   vertical frame elements extending between the traverses, the vertical frame elements, the upper traverse and the lower traverse are joined together to form and define a rigid frame;
   a central traverse vertically reciprocal on the elements between the upper and lower traverses;

means for feeding a workpiece horizontally through the press between the upper traverse and the central traverse;

a stationary support adjacent the frame;

a linear guide in which the frame is capable of at least limited vertical movement relative to the support, the linear guide is connected between the frame and the support;

drive means connected between the support, the frame, and the central traverse for vertically reciprocating the frame and the central traverse relative to the support; and cam means operatively upwardly engageable with the frame and downwardly engageable with the support for establishing a lowermost position for the frame.

5. The press defined in claim 4 wherein the drive means includes a shaft journaled in one of the traverses;

an eccentric carried on the shaft;

a link connecting the eccentric to another of the traverses; and a motor connected to the shaft for rotating same.

6. The press defined in claim 5 wherein the link is an arm having one end carried on the eccentric and an opposite end journaled on the other traverse.

7. The press defined in claim 5 wherein the other traverse is the central traverse.

8. The press defined in claim 5, further comprising another eccentric on the shaft bearing on the support and set such that the central traverse and the frame are reciprocated synchronously oppositely.

9. The press defined in claim 8 wherein the drive means further includes a roller on the support bearing on the other eccentric.

10. The press defined in claim 4 wherein the support carries a roller and the cam means has an angled cam surface bearing downward on the roller.

11. The press defined in claim 4 wherein the cam means includes a cam bar linearly shiftable in the upper traverse or the lower traverse and formed with the cam surface.

12. The press defined in claim 11, further comprising latch means for securing the cam bar in at least one position with the cam surface bearing downward on the roller.

13. A press comprising:

an upper traverse;

an upper die carried on a lower face of the upper traverse;

a lower traverse below the upper traverse;

vertical frame elements extending between the traverses, the vertical frame elements, the upper traverse and the lower traverse are joined together to form and define a rigid frame;

a central traverse vertically reciprocal on the elements between the upper and lower traverses;

a lower die carried on an upper face of the central traverse means for feeding a workpiece horizontally through the press between the upper die and lower die;

a stationary support adjacent the frame;

a linear guide means in which the frame is capable of at least limited vertical movement relative to the support, the linear guide means is connected between the frame and the support; and drive means including a first eccentric operatively engaged between the frame and the central traverse for vertically reciprocating the central traverse relative to the frame and a second eccentric operatively engaged between the frame and the support for vertically reciprocating the frame relative to the support synchronously in a direction opposite to a reciprocating directon of the central traverse.

14. The press defined in claim 13 wherein the drive means includes a shaft journaled in one of the upper and lower traverses and carrying both of the eccentrics.

* * * * *